United States Patent [19]

Fujiwara et al.

[11] 4,367,202
[45] Jan. 4, 1983

[54] CENTRIFUGAL COUNTER-FLOW LIQUID CONTACTOR

[75] Inventors: Kiyoshi Fujiwara, Kudamatsu; Masaru Fujimoto, Hofu; Shoji Nomura, Kudamatsu; Hiroshi Kanekiyo, Kudamatsu; Shoji Yoshinaga, Kudamatsu, all of Japan

[73] Assignee: Hitachi, Ltd., Tokyo, Japan

[21] Appl. No.: 252,785

[22] Filed: Apr. 10, 1981

[30] Foreign Application Priority Data

Apr. 11, 1980 [JP] Japan ................... 55-46827

[51] Int. Cl.³ ............................. B01D 11/04
[52] U.S. Cl. .................... 422/258; 210/511; 366/220; 494/22
[58] Field of Search ............... 422/258, 259; 23/306; 261/88–90, 87; 233/3, 14 R, 15; 366/220, 224, 225; 210/634, 642, 511, 512.1

[56] References Cited

U.S. PATENT DOCUMENTS

| 2,670,132 | 2/1954 | Podbielniak | 422/258 X |
| 2,850,362 | 9/1958 | Scheibel | 422/259 |
| 3,017,253 | 1/1962 | Coleby | 422/259 |
| 3,053,440 | 9/1962 | Doyle et al. | 422/258 X |
| 3,107,218 | 10/1963 | Doyle | 422/258 X |
| 3,116,246 | 12/1963 | Podbielniak | 422/258 X |
| 3,254,832 | 6/1966 | Doyle et al. | 233/15 |
| 3,344,981 | 10/1967 | Podbielniak et al. | 233/15 |
| 3,344,982 | 10/1967 | Todd | 233/15 |
| 3,344,983 | 10/1967 | Podbielniak | 233/15 |
| 3,445,060 | 5/1969 | Doyle et al. | 233/15 |
| 3,814,307 | 6/1974 | Hengstebeck | 233/15 X |
| 4,225,079 | 9/1980 | Yoshinaga et al. | 233/15 |
| 4,326,666 | 4/1982 | Fujiwara et al. | 233/15 |

FOREIGN PATENT DOCUMENTS

| 2851882 | 6/1979 | Fed. Rep. of Germany | 422/258 |
| 35-3823920 | 5/1960 | Japan . | |
| 45-25684 | 8/1970 | Japan . | |
| 48-747 | 11/1973 | Japan | 233/15 |
| 2024644 | 1/1980 | United Kingdom | 422/258 |
| 592422 | 4/1978 | U.S.S.R. | 422/258 |

Primary Examiner—Richard L. Chiesa
Attorney, Agent, or Firm—Antonelli, Terry & Wands

[57] ABSTRACT

A centrifugal counter-flow liquid container contactor in which a light liquid and a heavy liquid are introduced into a rotary body fixed to a rotary shaft from the outer peripheral portion and the inner peripheral portion of the rotary body, respectively, so that the light liquid and heavy liquid make counter-flow contact with each other and, after the contact, the light liquid and heavy liquid are discharged from the inner peripheral portion and outer peripheral portion of the rotary body. Disc-shaped partition plates are disposed at both sides of radially extending pipes within the rotary body such as a light liquid introduction pipe, heavy liquid discharging pipe and so forth inserted into the rotary body, so as to separate these radial pipes from the region where the light and heavy liquids are mixed with each other.

4 Claims, 3 Drawing Figures

CENTRIFUGAL COUNTER-FLOW LIQUID CONTACTOR

BACKGROUND OF THE INVENTION

1. Field of the Invention

The present invention relates to a centrifugal counter-flow liquid contactor for use in a centrifugal extractor in which a heavy liquid and a light liquid insoluble to each other are made to contact with and then separated from each other.

2. Description of the Prior Art

FIGS. 1 and 2 in combination show a conventional centrifugal counter-flow liquid contactor. Referring to these Figures, the centrifugal counter-flow liquid contactor has a rotary body 2 adapted to rotate as a unit with a rotary shaft 1. A multiplicity of porous cylinders 3 are mounted within the rotary member 2 concentrically with the rotary shaft 1 in a plurality of stages. A reference numeral 4 denotes a heavy liquid introduction pipe adapted to introduce the heavy liquid into the rotary body 2 through a passage 12, while a reference numeral 5 denotes a heavy liquid discharge pipe through which the heavy liquid is discharged from the space inside the rotary body, via a passage 13. The light liquid is introduced into the rotary body 2 through a light liquid introduction pipe 6 via a passage 14. These pipes 4, 5 and 6 are arranged radially. A reference numeral 7 designates a light liquid discharge pipe. Reference numerals 8 and 9 designate directions of flow of the light liquid and heavy liquid caused by the rotation of the rotary body 2. A reference numeral 10 designates a plurality of rinsing pipes arranged radially and adapted to close the rinsing ports in the rotary body 2. In the case where the liquid contactor has a substantial axial width, the rinsing pipes are arranged in a plurality of stages spaced in the axial direction to facilitate the rinsing.

From a macroscopic point of view, the light liquid flows, as designated at a reference numeral 8, in the same direction as the rotation of the rotary body 2 and toward the inside of the latter. In contrast, as designated at a reference numeral 9, the heavy liquid flows in the direction opposite to the direction of rotation of the rotary body 2 toward the outside of the latter. In this liquid contactor, the radially extending pipes such as the heavy liquid discharge pipe 5, light liquid introduction pipe 6, rinsing pipes 10 and so forth obstructs the circumferential flow of the heavy and light liquids to cause non-uniform flow of these liquids resulting in a deteriorated mixing effect of the heavy and light liquids and, hence, in a deteriorated extraction performance.

SUMMARY OF THE INVENTION

It is, therefore, an object of the invention to provide a centrifugal counter-flow liquid contactor in which the flow of liquids in the rotary body is smoothed and uniformalized to enhance the mixing effect to improve the extraction efficiency.

To this end, according to the invention, there is provided a centrifugal counter-flow liquid contactor in which radial insertions are placed in the region where the heavy and light liquids are mixed with each other and disc-shaped partition plates are placed at both sides of the radial insertions to separate the latter from the region of mixing of the heavy and light liquids.

DESCRIPTION OF THE PREFERRED EMBODIMENTS

Figure 1:
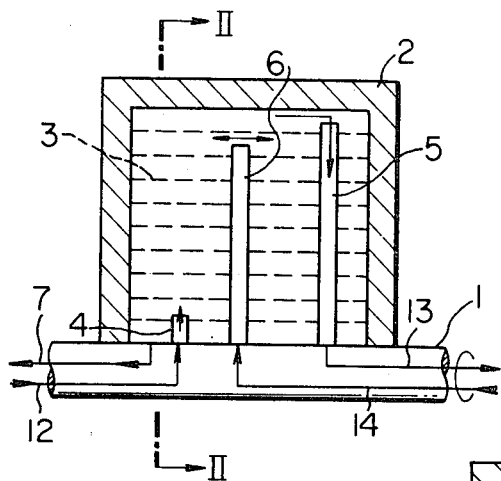
FIG. 1 is a vertical sectional view of a conventional centrifugal counter-flow liquid contactor with a part thereof being removed.

A preferred embodiment of the invention will be described hereinunder with specific reference to FIG. 3.

The centrifugal counter-flow liquid contactor of the invention has a rotary body 2 fixed to a rotary shaft 1 and accomodating porous cylinders (separation discs) 3. The light liquid is introduced into the rotary body 2 from the outer peripheral portion of the latter through a light liquid introduction pipe 6 and via a passage 14 formed in the rotary shaft 1, while the heavy liquid is introduced into the rotary body 2 from the inner peripheral portion of the latter through a heavy liquid introduction pipe 4 and via a passage 12. The heavy liquid which have reached the outer peripheral portion of the rotary body 2 is discharged through a heavy liquid discharge pipe 5. Also, means are provided to discharge the light liquid which has reached the inner peripheral portion of the rotary body 2. As the rotary body 2 rotates, the heavy liquid flows circumferentially and radially outwardly while the light liquid flows circumferentially and radially inwardly so that the heavy and light liquids make a counter-flow contact with each other. More specifically, the light liquid flowing radially inwardly flows circumferentially in the same direction as the rotation of the rotary body, while the heavy liquid flowing radially outwardly flows circumferentially in the direction opposite to the direction of rotation of the rotary body. Thus, the light liquid and heavy liquid flows spirally in the circumferentially opposite directions to reach the inner side and outer side of the rotary body 2.

According to the invention, in order to separate or isolate the insertions radially inserted into the counter-flow contact region of two liquids to smooth the flow of these liquids, disc-shaped partition plates 11 are disposed at both sides of the radially extending pipes such as the heavy liquid discharge pipe 5, light liquid introduction pipe 6 and so forth, so as to separate or isolate the radial insertions from the region where the two liquids are mixed with each other.

The presence of the radially extending pipes hinders seriously the circumferential flows of the light and heavy liquids caused by the rotation of the rotary body 2 to make these flows non-uniform, resulting in an insufficient contact and mixing of the heavy and light liquids, resulting in a deteriorated extraction performance. According to the invention, however, this problem is overcome because the radially extending pipes are isolated from the mixing region.

The extraction performance of the centrifugal counter-flow liquid contactor of the invention having the partition plates 11 for isolating the radially extending pipes was compared with that of the conventional centrifugal counter-flow liquid contactor having no partition plate.

It was confirmed that, while the theoretical number of stages in the conventional contactor is 3.4, the theoretical number of stages in the contactor of the invention is 5.3. Thus, the extraction performance of the contactor of the invention is much superior to that of the conventional one.

Figure 3:
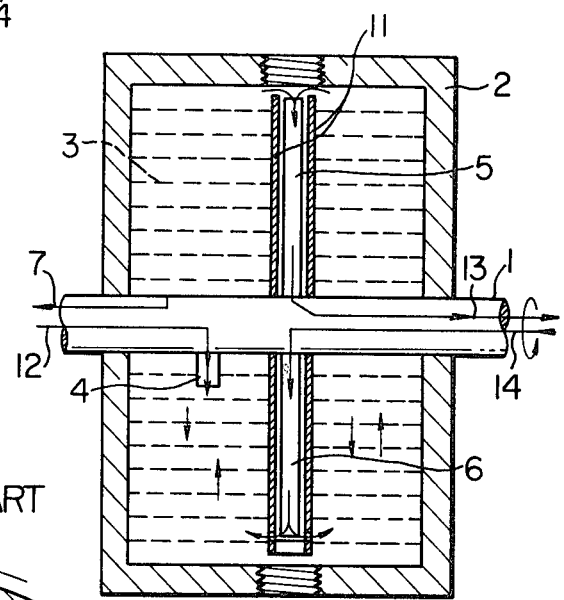
FIG. 3 is a vertical sectional view of a centrifugal counter-flow liquid contactor constructed in accordance with an embodiment of the invention.
Figure 2:
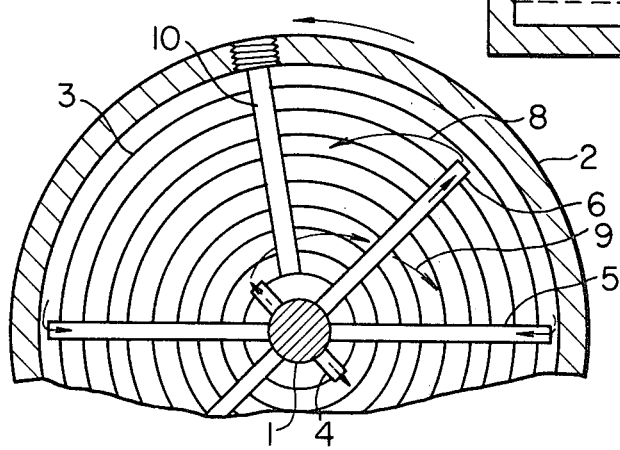
FIG. 2 is a sectional view taken along the line II—II of FIG. 1.

A test was conducted to compared the extraction performances of the conventional liquid contactor shown in FIG. 1 and the liquid contactor of the invention having the construction shown in FIG. 3, with the same structure in the rotary body 2 and with the same liquids. As stated below, the liquid contactor of the present invention showed an extraction performance much superior to that of the conventional one.

Theoretical number of stages in conventional liquid contactor shown in FIG. 1:
3.3 (in case of large-sized apparatus)
1.5 (in case of small-sized apparatus)
Theoretical number of stages in liquid contactor of the invention shown in FIG. 3:
5.2 (in case of large-sized apparatus)
2.3 (in case of small-sized apparatus)

Thus, the present invention offers an about 50% improvement of the extraction performance.

What is claimed is:

1. A centrifugal counter-flow liquid contactor comprising a rotary body fixed to a rotary shaft, inlet means for introducing a light liquid and heavy liquid from the outer peripheral portion of the rotary body and from a passage in the rotary shaft, respectively, so that the light liquid and heavy liquid make counter-flow contact with each other and outlet means for discharging the heavy liquid and light liquid, after contact, from the outer peripheral portion and the central portion of the rotary body, respectively, said inlet means including a light liquid introducing pipe and said outlet means including a heavy liquid discharge pipe, said pipes extending radially from the rotary shaft in a mixing region of light liquid and heavy liquid, and disc-shaped partition plates which are disposed at both sides of said light liquid introducing pipe and heavy liquid discharge pipe to partition these pipes from the mixing region of light liquid and heavy liquid.

2. A centrifugal counter-flow liquid contactor having a rotary shaft, a rotary body fixed to said rotary shaft and means for introducing and discharging a heavy liquid and for introducing and discharging a light liquid into and out of said rotary body, said means including a first radially extending pipe arranged within said rotary body for introducing the heavy liquid from an inner peripheral portion of said rotary body, and a second radially extending pipe extending into said rotary body for introducing said light liquid from the outer peripheral portion of said rotary body whereby said heavy liquid and said light liquid make counter-flow contact with each other and said means also including a third radially extending pipe for discharging the heavy liquid, after contact, from the outer peripheral portion of said rotary body and an outlet for said light liquid arranged to discharge the light liquid from the inner peripheral portion of said rotary body; and disc-shaped partition plates disposed at both sides of each of said second and third radially extending pipes to separate said radially extending pipes from the region where said heavy liquid and said light liquid are mixed with each other prior to being discharged from said rotary body.

3. A centrifugal counter-flow liquid contactor according to claim 2, wherein said first radially extending pipe has a discharge end arranged at the inner peripheral portion of said rotary body, said second radially extending pipe has a discharge end at the outer peripheral portion of said rotary body and said third radially extending pipe has an inlet end at the outer peripheral portion of said rotary body and the outlet for discharging said light liquid is arranged in the rotary shaft.

4. A centrifugal counter-flow liquid contactor according to claim 2, wherein said means for introducing and discharging a heavy liquid and for introducing and discharging a light liquid into said rotary body includes passages located within said rotary shaft operatively associated with each of said radially extending pipes and the outlet for discharging the light liquid, said radially extending pipes being connected to said rotary shaft and being spaced from radially extending walls defining the width of said rotary body.

* * * * *